US011669660B2

(12) United States Patent
Schmidt et al.

(10) Patent No.: US 11,669,660 B2
(45) Date of Patent: Jun. 6, 2023

(54) DESIGNING A MECHANICAL PART WITH TOPOLOGY OPTIMIZATION

(71) Applicant: DASSAULT SYSTEMES, Vilizy Villacoublay (FR)

(72) Inventors: Martin-Pierre Hugo Schmidt, Velizy Villacoublay (SA); Auxkin Ortuzar Del Castillo, Vilizy Villacoublay (FR); Claus Bech Wittendorf Pedersen, Hamburg (DE)

(73) Assignee: DASSAULT SYSTEMES, Velizy Villacoublay (FR)

( * ) Notice: Subject to any disclaimer, the term of this patent is extended or adjusted under 35 U.S.C. 154(b) by 772 days.

(21) Appl. No.: 16/673,649

(22) Filed: Nov. 4, 2019

(65) Prior Publication Data
US 2020/0143009 A1 May 7, 2020

(30) Foreign Application Priority Data

Nov. 4, 2018 (EP) .................................. 18306445

(51) Int. Cl.
| | | |
|---|---|---|
| *G06F 30/23* | (2020.01) | |
| *B29C 64/393* | (2017.01) | |
| *G06F 17/18* | (2006.01) | |
| *B33Y 50/02* | (2015.01) | |
| *G06F 119/18* | (2020.01) | |

(52) U.S. Cl.
CPC ............ *G06F 30/23* (2020.01); *B29C 64/393* (2017.08); *G06F 17/18* (2013.01); *B33Y 50/02* (2014.12); *G06F 2119/18* (2020.01)

(58) Field of Classification Search
CPC ...... G06F 30/23; G06F 17/18; G06F 2119/18; G06F 30/17; B29C 64/393; B33Y 50/02; Y02P 90/02
USPC .......................................................... 700/98
See application file for complete search history.

(56) References Cited

U.S. PATENT DOCUMENTS 9,471,720 B1 * 10/2016 Aalami .................... G06F 30/13
2019/0026415 A1 * 1/2019 Han ........................ B33Y 50/02

OTHER PUBLICATIONS

Extended Search Report dated Apr. 25, 2019; In European Patent Application No. 13306445.0-1224. (11 pgs.).
Krister Svanberg; "The Method of Moving Asymptotes—A New Method for Structural Optimization"; International Journal for Numerical Methods in Engineering; Chichester, GB; vol. 24; 1987; (15 pgs).

(Continued)

*Primary Examiner* — Michael J Brown
(74) *Attorney, Agent, or Firm* — Oblon, McClelland, Maier & Neustadt, L.L.P.

(57) ABSTRACT

The disclosure notably relates to a computer-implemented method for designing a modeled object. The method includes obtaining a finite element mesh, data associated to the finite element mesh and a non-uniform distribution of one or more local quantity constraints. The data associated to the finite element mesh include forces, boundary conditions, parameters, and a global quantity constraint. The method also comprises performing a topology optimization based on the finite element mesh, the data associated to the finite element mesh, and the non-uniform distribution. The method improves the design of a modeled object representing a mechanical part by topology optimization.

16 Claims, 10 Drawing Sheets

(56) References Cited

OTHER PUBLICATIONS

Allan Roulund Gersborg, et al.; "An explicit Parameterization for Casting Constraints In Gradient Driven Topology Optimization"; Struct Multidisc Optim; 2011; DOI 10.1007/s00158-011-0632-0; (7 pgs.).

Xiaoping Qian; "Undercut and Overhang Angle Control in Topology Optimization: a Density Gradient Based Integral Approach"; International Journal of Numerical Methods in Engineering; vol. 111. No. 3; Jul. 20, 2017; XP055579929. (38 pgs.).

Jun Wu, et al.; "Infill Optimization for Additive Manufacturing—Approaching Bone-like Porous Structures"; arXiv:1608.04366v2; [cs.GR]; Nov. 19, 2016. (14 pgs.).

* cited by examiner

DESIGNING A MECHANICAL PART WITH TOPOLOGY OPTIMIZATION

CROSS-REFERENCE TO RELATED APPLICATIONS

This application claims priority under 35 U.S.C. § 119 or 365 to European Application No. EP 18306445.0, filed Nov. 4, 2018. The entire contents of the above application(s) are incorporated herein by reference.

FIELD OF THE INVENTION

The invention relates to the field of computer programs and systems, and more specifically to a method, system and program for designing a modeled object representing a mechanical part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Some of these systems provide functionalities that employ topology optimization. Topology optimization is a computer-implemented technique bridging the fields of product design and physical simulation. It is applied for designing a modeled object representing a mechanical part formed in a material, subject in use loads and having one or more constrained boundaries. This technique focuses on automatically generating optimized generative designs based on modifying their physical properties and behavior typically simulated through Finite Element Analysis (FEA). More specifically, topology optimization works by providing a Finite Element Mesh (FEM) for example by discretizing a design space in small elements, and data associated to the mesh. The technique then finds the optimal distribution and layout of material in the given discrete space by iteratively finding the most efficient elements with respect to a given objective function (e.g. related to the stiffness of the design) and a set of constraints (e.g. related to the total amount of allowable material).

Within this context, there is a need for an improved solution for designing a modeled object representing a mechanical part formed in a material, subject in use to loads and having one or more constrained boundaries.

SUMMARY OF THE INVENTION

It is therefore provided a computer-implemented method for designing a modeled object. The modeled object represents a mechanical part. The mechanical part is formed in a material. The mechanical part is subject in use to loads and the mechanical part has one or more constrained boundaries. The method comprises providing a finite element mesh, data associated to the finite element mesh and a non-uniform distribution of one or more local quantity constraints. The data associated to the finite element mesh include forces, boundary conditions, parameters, and a global quantity constraint. The forces represent part of the loads. The boundary conditions represent at least part of the one or more constrained boundaries. The parameters are related to the material. The global quantity constraint is relative to a global quantity of the material in the finite element mesh. Each local quantity constraint of the non-uniform distribution is relative to a respective local quantity of the material in a respective local zone of the finite element mesh. The method also comprises performing a topology optimization based on the finite element mesh, the data associated to the finite element mesh, and the non-uniform distribution.

The method forms an improved solution for designing a modeled object representing a mechanical part formed in a material, subject in use to loads and having one or more constrained boundaries. Notably, based on the finite element mesh and the data associated to the finite element mesh, the method performs a topology optimization and thereby achieves in an efficient manner a design optimized from the mechanical point of view given a constraint relative to global material quantity. In particular, the method yields a result optimized for the part of the loads to which the mechanical part is subject in use, and which are represented by the forces included in the data associated to the mesh. In addition, the method provides for integrating one or more local material quantity constraints to the topology optimization, thereby allowing in each local zone respective to such a local constraint, a control on local material quantity and on the mechanical effects thereof. Furthermore, thanks to the distribution of the one or more local quantity constraints being non-uniform, the method allows a position-wise differentiation of said mechanical effects. Thus, the one or more local material quantity constraints provide a means to compensate for the fact that forces included in the data associated to the mesh cannot and do not represent all the loads to which the mechanical part is subject in use. In particular, the method allows increasing mechanical robustness in view of real future loads that will apply to the mechanical part but that are not integrated directly as forces in the topology optimization problem formulation.

The method may comprise one or more of the following:
  each local quantity constraint represents a respective upper bound for the respective local quantity;
  the mesh has a set of elements each having a respective relative density of the material which varies during iterations of the topology optimization, the non-uniform distribution comprising a plurality of local quantity constraints each on a respective element, the respective local zone of each respective local quantity constraint being a respective neighborhood of the respective element, the respective local quantity of each respective neighborhood being a respective average of the relative density of the material in the respective neighborhood;

the method comprises aggregating the plurality of local volume constraints into a single aggregated constraint;

the aggregated constraint represents a constant bound for an extremum, defined over the set of elements, of a disparity between the respective average and the respective upper bound;

the extremum is a maximum, and the aggregated constraint approximates said maximum with a differentiable function, and performing the topology optimization comprises performing a gradient-based optimization;

the differentiable function is a P-Norm;

the gradient-based optimization is a method of moving asymptotes;

the method comprises, prior to performing the topology optimization, performing another topology optimization based on the finite element mesh and the data associated to the finite element mesh, and determining the non-uniform distribution based on a result of the other topology optimization;

the result of the other topology optimization comprises a density field, a strain field, a stress field and/or a compression field, and determining the non-uniform distribution comprises determining one or more local quantity constraints automatically based on the density field, the strain field, the stress field and/or the compression field, and/or displaying a graphical representation of the density field, the strain field, the stress field and/or the compression field, and determining one or more local quantity constraints via user-interaction; and/or the mechanical part is an additive manufacturable part, a part having one or more functional outer regions and one or more internal regions, and/or a vehicle part.

It is further provided a modeled object designable or obtainable by the method. Due to the non-uniform distribution of one or more local quantity constraints each relative to a respective local quantity of the material in a respective local zone of the finite element mesh, the modeled object presents a non-uniform distribution/layout of porous, alveolar and/or complex structures, for example presenting an organic aspect with varying material/void ratio.

It is further provided a computer program comprising instructions for performing the method.

It is further provided a computer readable storage medium having recorded thereon the modeled object and/or the computer program.

It is further provided a system comprising a processor coupled to a memory and a graphical user interface, the memory having recorded thereon the modeled object and/or the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
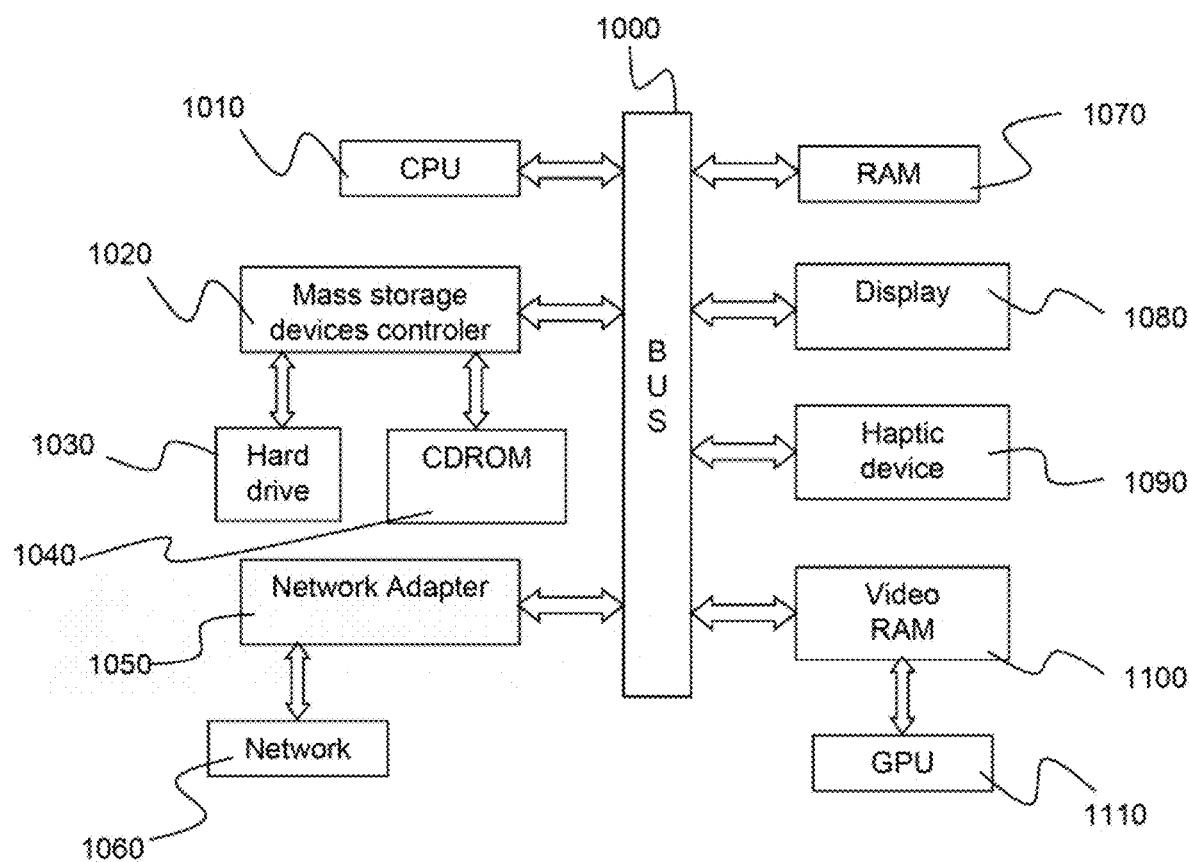
FIG. 1 shows an example of the system.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physically distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electromechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

FIG. 1 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

The method is for designing via a topology optimization a modeled object which represents a mechanical part, for example a 2D modeled object or a 3D modeled object. The method thus comprises providing inputs of the topology optimization, for example via user-interaction.

The inputs of the topology optimization include a FEM. The FEM represents a space containing the modeled object to be designed. The FEM may be 2D or 3D, depending on whether a 2D modeled object or a 3D modeled object is to be designed. The FEM may be regular or irregular. A regular FEM allows easier computations during the topology optimization. The FEM may be of any type, for example with each finite element being a tetrahedron or a hexahedron. Providing the FEM may comprise defining a design space and a meshing of the design space. The method may comprise displaying the FEM to the user, and, by the user, defining other inputs of the topology optimization, e.g. including by graphical user-interaction on the displayed FEM.

By "graphical user-interaction" with respect to defining an element, it is hereby meant any user-interaction where the designer employs a haptic system (e.g. a mouse or a touch device such as a sensitive/touch screen or a sensitive/touch pad) to activate one or more locations of the display unit and where the element is to be positioned. Activating a location of a scene may comprise positioning thereon the cursor of a mouse or performing a touch thereon. Substantially real-time after the activation, a representation of the defined element may be displayed.

The inputs of the topology optimization further comprise data associated to the FEM and which depend on the mechanical part that the user wants to design.

These associated data include parameters related to the material, in other words data representing the material in which the mechanical part is formed. These material parameters may in particular represent mechanical characteristics of the material. The material parameters may for example include the Young modulus of the material and/or the Poisson ratio of the material. In examples, the user may specify a material, for example by selection from a list, and/or the system may determine automatically the material parameters and/or propose selection thereof to the user, for example based on one or more formulas and/or on a database. The material can be any material, for example a solid and/or isotropic material, such as a metal (e.g. steel, silver, gold, titanium), a plastic (e.g. nylon, ABS, polycarbonates, resins), a ceramic or a composite for example.

The associated data further include a global quantity constraint. The global quantity constraint is relative to a global quantity of the material in the FEM. In other words, the global quantity constraint restricts values of the total quantity of the material in the whole FEM. The global quantity constraint may for example be provided as a boundary of the fraction of the (whole) FEM which can be filled with the material, for example an upper bound for said fraction. Alternatively, the global quantity constraint may rather than a boundary provide a value which has to be reached. The topology optimization may however optimize an objection function which tends to use as much material as available in the optimal result, rendering such an equality constraint equivalent to an upper bound constraint. In all cases, the fraction may be a volume fraction (also referred to as GVC in such a case, as in "Global Volume Constraint"). In other examples, the global quantity constraint may involve values representing weight of the material.

As known per se from the field of topology optimization, the associated data further include data representing conditions of use of the mechanical part and based on which the topology optimization is able to optimize the mechanical part model in view of such foreseen use.

The associated data notably include forces. In other words, the associated data include vectors (e.g. with magnitudes in Newtons or in a multiple thereof) each applicable and linked to one or more finite elements of the FEM. These forces represent partially the loads to which the mechanical part will be subject when used. In other words, for each one or more finite elements of the FEM for which a respective force is present in the data, the data represent the fact that material of the mechanical part at locations corresponding to said one or more finite elements will be subject to corresponding loads. But since a mechanical part may theoretically be subject to an infinite number of loads, not all loads are represented by the forces present in the data. The forces only represent a restriction of the whole set of loads, for example most significant ones and/or most representative ones. The forces may be determined for each modeling problem and may be chosen to be the largest (i.e. highest magnitude) forces the object may be subject to during its lifetime, since these forces tend to cause the largest deformations and mechanical stresses. These forces may be grouped in sets called load-cases. An industrial problem may in examples have between one and a dozen load-cases. In examples, the user may select via graphical user-interaction finite elements of the FEM, and then specify a force applicable thereto.

The associated data also include boundary conditions. Each boundary condition applies and is linked to one or more finite elements of the mesh and represents a respective constraint on the boundary to which the mechanical part is subject in use. In other words, each boundary condition represents the fact that material of the mechanical part at locations corresponding to said one or more finite elements is subject to a constraint on its displacement, for example using Dirichlet boundary conditions. An element may have its displacement constrained (among others) along a plane, along a curve, along/around an axis, or to/around a point, and/or its displacement may be only constrained only in translation, only in rotation, or in both translation and rotation. In the case of a displacement constrained to a point both in translation and rotation, the element is fixed in 3D space and is said to be "clamped". An element may however have its displacement constrained in translation along a plane but move freely on said plane (e.g. if it belong to an object mounted on a bearing), in translation along an axis but move freely on said axis (e.g. in a piston), or in rotation around an axis (e.g. joints of a robotic arm).

In examples, the boundary conditions represent all the constrained boundaries. In other words, for each finite element of the FEM which is intended to eventually contain material that is constrained (e.g. to remain fixed), a boundary (e.g. clamping) condition may be associated to integrate this fact in the topology optimization. In examples, the user may select via graphical user-interaction finite elements of the FEM, and then specify that boundary conditions are applicable thereto.

In examples, the one or more constrained boundaries of the mechanical part comprise or consist of one or more fixed boundaries (i.e. the material at said one or more boundaries cannot move), and the corresponding one or more boundary conditions are clamping conditions.

The topology optimization may as widely known comprise optimizing automatically an objective function based on the inputs. The objective function may represent any mechanical characteristic to be optimized. The topology optimization may in particular maximize stiffness. The objective function may for that be the compliance function. The compliance is for a structure the inverse of the stiffness of the structure. The compliance thus encapsulates the amount of deformation of the structure considering specified load scenarios and fixed boundary conditions. Therefore, when the optimization process minimizes the compliance, this corresponds to maximize the stiffness of the design for a given mass. The free variable of the objective function may be the distribution (i.e. layout) of quantity (e.g. volume fraction) of material over the FEM. The topology optimization may thus vary the material quantity (e.g. volume fraction) in each finite element of the mesh to optimize the objective function. The objection function may depend on the material parameters (i.e. fixed variables of the objective function may involve the material parameters) and the optimization may be performed under constraint, including the global quantity constraint. The optimization may be performed according to any algorithm, for example an iterative algorithm. In case the material quantity is a volume fraction of the material, the optimization process yields a distribution of finite-element-wise material volume fractions. In such a case, the topology optimization or the method may comprise a further step of filtering (e.g. automatically), that is, determining for each finite element whether it is (fully) filled with material or not based on such volume fraction distribution. For example, this may be based on a comparison with a (e.g. predetermined) threshold (e.g. higher than 0.1 or 0.2 and/or lower than 0.9 or 0.8, e.g. of the order of 0.5), a finite element being considered as fully filled with material (resp. totally empty) if the volume fraction resulting from the optimization is higher (resp. lower) than the threshold. The method may in examples further comprise computing (e.g. automatically) a 3D modeled object, such as a boundary representation (B-Rep) model, based on the result. For example, the method may compute swept volumes based on and along series of finite elements resulting from the optimization and/or the filtering.

As known per se, a topology optimization may already be performed to determine distribution of a material in the FEM, based on the FEM, the forces, the boundary conditions, the material parameters and the global quantity constraint. The method goes beyond such a general topology optimization by adding the non-uniform distribution of one or more local quantity constraints to the optimization problem. The method may thus either not perform the general topology optimization at all and only perform a topology optimization with the non-uniform distribution, or, as will be discussed later, perform first a general topology optimization and then a topology optimization with the non-uniform distribution. In both cases, the method integrates steps of the general topology optimization workflow, such steps being now discussed through an example of the general topology optimization workflow.

Figure 2:
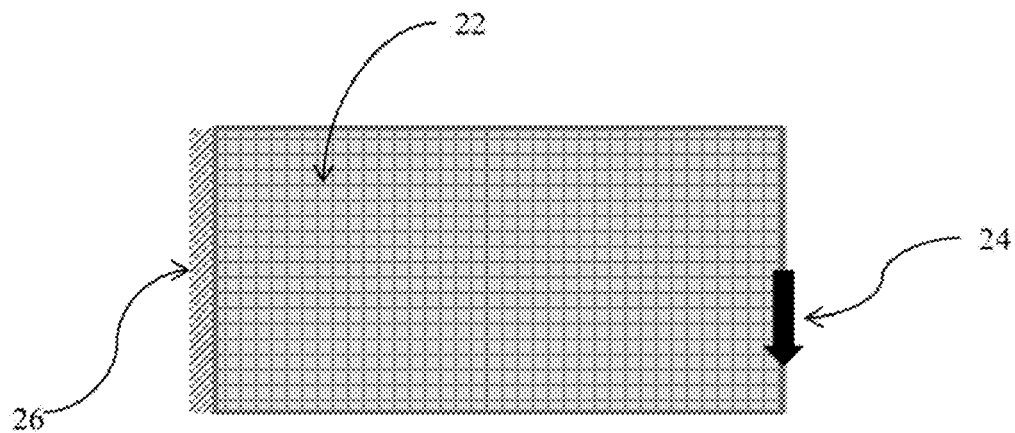
FIGS. 2, 3, 4, 5, 6, 7, 8, 9, 10, 11, 12, 13, 14, 15, 16, 17, 18, 19 and 20 illustrate the method.

As shown in FIG. 2 which illustrates specification of a topology optimization scenario, the general topology optimization workflow requires as input a design space 22 (which is here subdivided in small square elements), a set of load-cases 24 (the forces that will be applied on the design) and boundary conditions 26 (locations where the design is constrained for deformations, e.g. "being clamped", here on the whole left side of the design space 22). Additional parameters can be defined, e.g. an outer shell that must be kept, the mechanical constitutive properties of the chosen materials, the target mass, the maximum allowed deformation, or any other constraint. The design workflow may exclude provision of an initial geometry except from the design space definition, since the goal of topology optimization is to generate the optimized design from an empty canvas (which is the design space).

Figure 3:
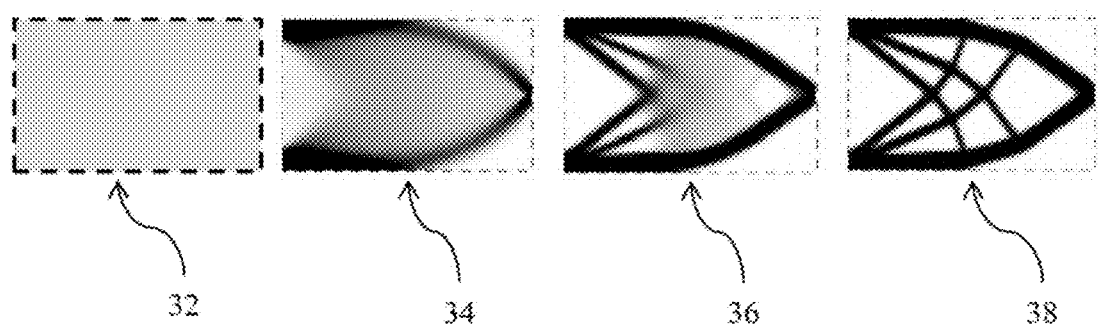

The output of the general topology optimization workflow is the geometry of the optimized design which complies as much as possible with the input specifications. FIG. 3 shows one such design being optimized, illustrating design evolving during the optimization process. In this example, the global volume fraction was set to 30%. FIG. 3 shows the initial design 32, the design after five optimization iterations 34, the design after ten optimization iterations 36, and the final converged design after twenty-five optimization iterations 38.

Figure 4:
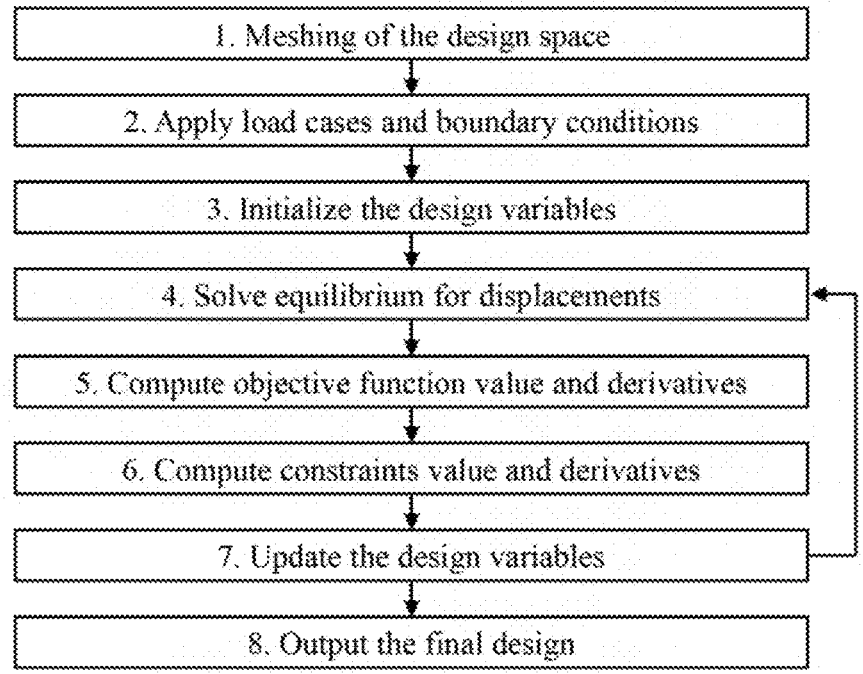

As shown in FIG. 4, the general topology optimization workflow may in examples follow eight steps described in the following:

1. Meshing of the Design Space

Create a discretization of the design space as shown in FIG. 2. This means subdividing the space into small simple connected elements e.g. tetrahedrons, hexahedrons. These small elements may later serve as both the FEM for the simulation and as design variables for the optimization.

2. Apply Load Cases and Boundary Conditions

Here, the general topology optimization workflow may take the forces and boundary conditions for a given input specification and apply them to the nodes of the FEM. FIG. 2 shows a mesh where the design space is subdivided into regular square elements. The nodes on the left side are clamped (fixed in 2D space) and a downward force is applied on the middle right hand side of the design space.

3. Initialize the Design Variables

Each element has a given relative density value defining whether it is empty or full of material, respectively defined by the values "0" and "1". Additionally, in order to make the optimization problem continuous, the general topology optimization workflow may allow the elements to take any value between 0 and 1. This may be referred to as "relaxation". Since the interpretation of elements with intermediate densities can be ambiguous, the general topology optimization workflow may introduce the penalization approach which forces intermediate elemental densities to be globally less efficient for the structural behavior than elements with the lower and upper bound of 0 or 1, respectively. This has the effect of driving the optimizer to produce final designs with few intermediate densities, while still maintaining the continuous formulation as shown in FIG. 3.

4. Solve for Equilibrium

At this point the general topology optimization workflow may have a complete defined finite element model being meshed and attached with forces and boundary conditions, and where each element has a relative density value. Thereby, the general topology optimization workflow may assemble the global stiffness matrix and solve for the nodal displacements of the structural equilibrium. In other words, the general topology optimization workflow may compute the deformation of the structure in its current state for the applied forces and boundary conditions.

5. Compute Objective Function Value and Derivatives

An objective function which may be used in any topology optimization is the compliance of the structure. It is the inverse of the stiffness and thus encapsulates the amount of deformation of the structure considering specified load scenarios and boundary conditions. Therefore, when the optimization process minimizes the compliance, this amounts to maximize the stiffness of the design for a given mass. Moreover, due to the large number of design variables in the process, the optimization may be performed with a gradient-based method. Therefore, the general topology optimization workflow may also compute the derivatives of the objective function with respect to each design variable. In other words, the general topology optimization workflow may compute how the relative density of each element should be changed to improve the compliance and fulfilling the constraints. For the compliance, this may be performed using the well-known and classic "Adjoint Sensitivity Analysis". Additionally, after the derivatives are calculated, these derivatives may be smoothed through a filtering to improve numerical stability. The general topology optimization workflow may reduce erroneous checkerboard patterns and introduce a length scale in the optimization, such that it is well-defined.

6. Compute Constraint Values and Derivatives

A constraint function in the general topology optimization workflow may be the global volume fraction of the structure. Such GVC defines the maximum material volume allowed to be used and therefore, the maximum mass of material constituting the designs. Consequently, the optimizer has to find the optimal distribution of this mass in the design space, maximizing the stiffness. FIG. 3 shows intermediate designs 34 and 36 in the optimization workflow where the global volume fraction is the same but the distribution of material changes during the optimization iteration in process. The derivatives for this constraint are equal to the elemental volume and if the elements are equal in size, then the derivatives are constant for each element and therefore trivial to compute.

7. Update the Design Variables Using Mathematical Programming

When the values of the objective function and the constraint are known as well as their derivatives then the general topology optimization workflow may use a gradient-based mathematical programming to modify the relative density of each element to improve the structural compliance without violating the specified GVC. Once the relative density value of each element has been modified by the mathematical programming, and the given modified design in the optimization process has not yet converged, then the general topology optimization workflow may loop back to step 4. A simple mathematical programming for this problem is the so-called Optimality Criteria (OC). In examples of the general topology optimization workflow and of the method, a more general mathematical programming algorithm may however be used: the Method of Moving Asymptotes (MMA, first described in "*The method of moving asymptotes—a new method for structural optimization*", Krister Svanberg, International Journal for Numerical Methods in Engineering, February 1987). It has been observed that the MMA was particularly efficient in the case of the method, as it can handle multiple nonlinear constraints and the method has the specificity of presenting a high number of variables and only few constraints. However, any other mathematical programming algorithm may also be used.

8. Output the Final Design

Once convergence is achieved, the general topology optimization workflow may present a finalized design in the design space where each element has an optimized relative density value. Through a simple thresholding process, the general topology optimization workflow may extract the geometry defined by the collection of elements whose relative density value is above a certain threshold (e.g. chosen to be 0.5). The general topology optimization workflow may now present the geometry of the optimized design which is the output of the general topology optimization workflow. FIG. 3 shows the final design 38 optimized on the specifications described in step 2 and shown in FIG. 2.

The method may implement all steps of this general topology optimization workflow and deviate therefrom only by providing an additional input to the topology optimization, which is the non-uniform distribution of one or more local quantity constraints each relative to a respective local quantity of the material in a respective local zone of the finite element mesh. The topology optimization is then based on such local quantity constraints in addition to the other inputs.

Each local quantity constraint is relative to a local quantity of the material in a respective local zone the FEM. In other words, the local quantity constraint restricts values of the total quantity of the material in the respective local zone. By "local zone", it is meant any subpart of the FEM, for example comprising less than 10% or 1% of the number of the finite elements of the FEM or even as low as 2 or 3 elements. The local quantity constraint may for example be provided as a boundary of the fraction of the respective local zone which can be filled with the material, for example an upper bound for said fraction. The fraction may be a volume fraction (also referred to as LVC in such a case, as in "Local Volume Constraint"). In other examples, the global quantity constraint may involve values representing weight of the material.

An upper bound constraint allows increasing robustness of the mechanical part, by forbidding concentration of material. In particular, local quantity constraints may be provided for respective local zones which together cover a region forming a subpart of the FEM, for example comprising less than 90% of the number of the finite elements of the FEM, for example about 80%. Each local zone may be relatively small, e.g. each local zone may comprise less than 10% or 1% of the number of finite elements of the FEM. In such a case, the method allows forcing robustness in the region by forbidding concentration of material beyond the respective upper bounds within the respective local zones forming the region. The method thereby forces spreading of the material in the region, whereas the reduction of all loads to a part thereof when formulating the optimization problem biases the optimization to a solution optimized for said part but not well-adapted to other loads which may occur in use. This further allows a reduced number of load-cases to be defined as inputs of the topology optimization, while still ensuring robustness of the structure in view of loads corresponding to undefined forces. In examples, less than 10 or 5 forces are provided as inputs in the method, each applicable to one or more respective finite elements.

Each local zone may comprise at least two finite elements of the FEM. Each local zone may form a connected space (from the topology point of view). The one or more local quantity constrains may provide for at least two different local zones (i.e. each respective to a different local quantity constraint) to be at least overlapping (i.e. having a non-void intersection).

In examples, each finite element of the FEM may be associated (i.e. linked) in the data structure to a respective datum dedicated to local constraint information relative to a respective neighborhood including the finite element. Each neighborhood may comprise or consist of all finite elements within a sphere centered on the finite element. The sphere may present a radius of a predetermined size (e.g. the same for all spheres), for example inferior to 20, 10 or 2 times the size of a finite element of the FEM (e.g. the FEM being regular, the size of a finite element being the length of an edge of a finite element of the FEM, e.g. all edges of all—e.g. hexahedral or tetrahedral—finite elements having the same length). Alternatively, the neighborhood may comprise or consist of all finite elements within an oriented ellipse, or another predetermined shape. The datum may represent absence of any constraint in the respective neighborhood (e.g. by providing an upper bound equal to 1 for a volume fraction of the material present in the respective neighborhood, which is equivalent to no constraint). The datum may alternatively represent presence of a respective (truly restrictive) constrain (e.g. by providing an upper bound higher to 0 and inferior to 1 for said volume fraction). The respective neighborhood of each finite element may be determined according to a predetermined scheme. Alternatively, the respective neighborhood of each finite element may be defined within the data representing the local constraints.

Now, the distribution of the one or more local quantity constraints is non-uniform. By "non-uniform", it is hereby meant that the FEM comprises at least two non-overlapping local zones which are constrained differently (with respect to material quantity inside the local zones). By "constrained differently", it is meant that one of the two zones is not constrained (i.e. respective to no local quantity constraint) and the other one is constrained (i.e. respective to a local quantity constraint), or that the two zones are both constrained (i.e. each respective to a local quantity constraint) but that the two local quantity constraint are different. Two local quantity constraint are said to be "different" if their respective local zones are of different size and/or shape, and/or the quantity values involved in the constraints are different (e.g. the two constraints involve different volume fraction upper bounds).

In examples, the one or more local quantity constraints may each be provided as an upper bound (e.g. between 0 and 1) for the fraction of a respective local zone which can be filled with the material. In these examples, the "non-uniform" distribution may be achieved by the FEM comprising one or more finite elements which do not belong to any local zone respective to a local quantity constraint (i.e. unconstrained finite element(s), for example amounting to at least 5% of the total number of finite elements, and/or by the one or more local quantity constraints comprising at least two local quantity constraints each provided as a different upper bound values (in other words, the one or more local quantity constraints comprise a first upper bound for the volume fraction of the material in one or more first local zones and a second upper bound for the volume fraction of the material in one or more second local zones, the first upper bound and the second upper bound being different one from the other, each strictly between 0 and 1).

The method thus adds a new type of constraint to the topology optimization formulation, that is the LVC, which leads to the apparition of so-called "bone-like" porous structures in regions comprising the local zones respective to the local constraints. These lightweight infill structures exhibit useful properties with respect to robustness.

Furthermore, the method adds this new constraint non-uniformly. In a naïve approach consisting of using this new constraint uniformly, the lack of control would limit the applicability of the present approach in an industrial setting. Particularly, enforcing a uniform LVC leads to increased stress in some regions of the design which increases the risk of structural failures.

The method thus gives a fine control over the LVC in the topology optimization formulation without impacting the convergence of the process. Moreover, the method may automatically make use of that new level of control over the LVC.

The method may in examples formulate the LVC so that it can be defined with a different value for each point in space. Thus, allowing it to vary across the design space. This may also lead to a modification of the computation for the local volume derivatives and these derivatives may be involved in the optimization process.

Now, having comprehensive control over the LVC values across the design space, the method may automatically create an appropriate and non-uniform (also referred to as "dynamic") scalar field of values to control the present constraint. This field may in particular examples be the result of another topology optimization where the so-called penalization has been deactivated, yielding intermediate design variables at many locations and where no LVC is enforced.

This new approach allows one to benefit from the robustness and reliability of the lightweight porous structure while also automatically modulating the LVC in areas of high stress and deformation. Potentially, it is also a useful tool for manually controlling and tailoring the design and mechanical properties. Moreover, this new approach adds almost no additional computational cost to the workflow for generating the optimized designs.

For the sake of an easier understanding of the method, the following discusses examples of the naïve uniform LVC topology optimization (referred to as "uniform LVC optimization" in the following) and explains how such examples fit within the general topology optimization workflow described previously. How examples of the method implement the LVC non-uniformly is presented afterwards, referring to the uniform LVC optimization discussion.

The concept of adding a LVC in the optimization workflow may amount to that, based on the workflow in FIG. 4, the optimization is provided in step 6 with an additional constraint and computes its corresponding derivatives for the design. Moreover, in step 7, the uniform LVC optimization may in examples use the MMA optimizer in particular to handle this additional nonlinear constraint (for the same reasons examples of the method use the MMA). Everything else in the overall workflow may stay identical.

The LVC can intuitively be interpreted using an analogy to the GVC. The GVC defines a maximum allowable amount of material in the design space. Thus, a GVC set to 30% means that the final design will at the most have 30% of the elements being filled up with solid material and at least 70% of the elements being empty representing void (assuming the ideal scenario where no design elements in the design space have intermediate relative densities).

The LVC works exactly the same way, but Instead of applying the maximum allowable amount of material in the entire design space, the LVC applies the maximum allowable amount of material for smaller partitions (i.e. local neighborhoods) of the design space. Meaning that, for an LVC set to 40% and a GVC set to 30% then the final design may at most have 30% of elements with solid material, and if one zooms in on a small partition of a defined size inside the design space, then one may at most have 40% elements with solid material.

Figure 5:
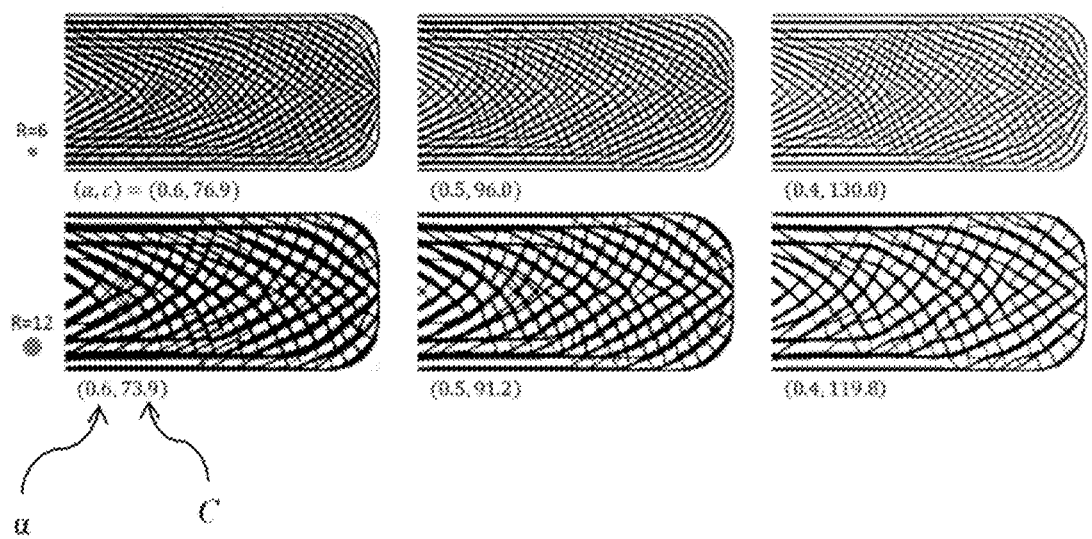

FIG. 5 shows multiple designs optimized with the uniform LVC optimization and with various sizes and magnitudes of the partitions for the local neighborhoods and for the local volume fractions, respectively. In particular, FIG. 5 shows six converged designs with LVC for different sets of design parameters: radius R and local volume fraction α which are for each design constantly distributed on the regular FEM via one LVC per finite element. FIG. 5 also provides the compliance C achieved each time. The design spaced applied for the design in FIG. 5 is the one shown in FIG. 2.

It is worth mentioning that the LVC is therefore a stronger (i.e. more constraining for the material layout) constraint than the GVC. Moreover, if an LVC-like constraint was defined for a size of the partition of the local neighborhood which covers the entire design space, it would become strictly equivalent to a GVC.

Computation and Implementation

For any given element in the design space, the uniform LVC optimization can sum the densities in their local neighborhood and thereby, obtain the local volume fraction for the given partition. However, having one local volume fraction per finite element yields too many constraints to be easily solvable by a standard mathematical programming algorithm. Instead, uniform LVC optimization may consider a constraint on the maximum local volume fraction of any elements, converting the maximum function into a single aggregated constraint which may be easily solved for the final design. Since the native max function is non-differentiable then it may be also more efficient to approximate it with a continuous and differentiable aggregation function e.g., the P-Norm. However, other continuous and differentiable aggregation function may also be used.

The derivatives of the present constraint may be calculated and implemented. The uniform LVC optimization now has evaluated the new constraint in step 6 of the workflow and can directly apply it to a mathematical programming algorithm, updating the relative densities of the design elements in step 7 similarly to the GVC. As stated before, the rest of the general topology optimization workflow may stay unchanged.

Examples of the method which build upon but deviate from the uniform LVC optimization are now discussed.

Non-Uniform/Dynamic Local Volume Constraint

One main key point for introducing the LVC may be to enforce the optimization to implicitly build more robust structures.

Robustness

The stiffness and stress of a structure are well-defined measures describing the resistance against deformation and failure under prescribed loading conditions. The robustness on the other hand refers to the ability of the structure to resist various conditions or unexpected events. Such unexpected events are inevitable and could be, for example, a change in the load cases like force directions, misuse load cases, manufacturing defects, buckling, or other events making the theoretical in prescribed specification not exactly matching their real life counterpart.

Since it is highly complex to perfectly describe every event that the mechanical part being designed will encounter in its lifetime, it may be efficient to optimize the designs to perform well in the expected and most common scenario while also having some robustness against unexpected events. The design process of the method may therefore form a balancing between optimization for the expected scenario and robustness for unexpected events.

The uniform LVC optimization creates porous structures and thus induces a redundancy in the structure which tends to implicitly have a positive effect on its robustness. However, because the constraint is applied uniformly on the design space, it also prevents the optimization to create strong, bulky and solid subcomponents in high deformable and stressed regions e.g. near the boundary conditions, forces or geometrically restricted areas in the design space.

Based on this consideration, the method may obtain a design benefiting from the robustness of porous structures obtained using one or more LVC while also allowing some important structural regions of the design space to be filled 100% up with material. This leads to a non-uniform distribution of local quantity constraints (also referred to as "dynamic" LVC in the following).

Implementations of the dynamic LVC where each local quantity constraint represents a respective upper bound for the respective local volume fraction of the material are now discussed. These implementations converge relatively robustly and fast.

As described before, the local volume fraction is a measure and may be defined for each finite element in the design space. This means that the method may consider applying the constraint only on a certain subset of the elements and leave the other elements free. The method generalizes this idea by allowing any arbitrary LVC for each element and its corresponding partition of the design space. In other words, the method may constrain the local volume fraction of a given element to be below any value (e.g. 40%), and below any other value (e.g. 45%) for the element next to it, and so on for every element in the Design Space. Alternatively, the method may also modulate the size of the local neighborhood (size of partition) considered for each element. In examples, the method may modulate both the local neighborhood size and local volume fraction within the given neighborhood for each design element.

In the naïve case of the uniform LVC, the constraint is simple to formulate since it is the same for every element so it is straightforward to apply using a given aggregation function e.g. the P-Norm. However, in the case of the dynamic LVC, the constraint may have a different value for each element. This means that the method may modify the constraint formulation to accommodate these local variations.

This is now discussed.

Let $\Omega$ be the set of elements in the FEM, e be a given element in the design space, $\rho_e$ be the relative density of the given element (i.e. the volume fraction of the material inside the given element), $\omega_e$ the set of elements within a neighborhood chosen for the given element, and $\overline{\rho_e}$ be the average relative density in the local neighborhood of the given element i.e. its local volume fraction. The method may consider:

$$\overline{\rho_e} = \frac{1}{|\omega_e|} \sum_{e' \in \omega_e} \rho_{e'} \quad \forall e \in \Omega$$

Let $\alpha_e$ be an LVC value for a given element. Enforcing the dynamic LVC means that for any element in the design space, the method provides as an input to the topology optimization the following set of constraints:

$$\overline{\rho_e} \leq \alpha_e \forall e \in \Omega$$

With $\alpha_e$ being strictly positive, this can be reordered as follows:

$$\frac{\overline{\rho_e}}{\alpha_e} \leq 1 \quad \forall e \in \Omega$$

The method may in examples aggregate this set of constraints into a single constraint with the max function:

$$G = \max_{e \in \Omega}\left(\frac{\overline{p_e}}{\alpha_e}\right) \leq 1$$

The method may constrain the topology optimization with G, or alternatively with a transform thereof into a differentiable function, as now explained.

Let p be the exponent value chosen for the P-Norm (with p higher or equal to 2 and/or lower or equal to 20 or 10, e.g. p=6), the method may in examples approximate the aggregated constraint G with:

$$G' = \left(\frac{1}{|\Omega|}\sum_{e \in \Omega}\left(\frac{\overline{p_e}}{\alpha_e}\right)^p\right)^{\frac{1}{p}} - 1 \leq 0$$

To clarify the differentiation steps, we introduce A to be:

$$A = \frac{1}{|\Omega|}\sum_{e \in \Omega}\left(\frac{\overline{p_e}}{\alpha_e}\right)^p$$

Within a gradient-based optimization, the gradient of the constraint G' can be computed by using the chain rule as follows:

$$\frac{\delta G'}{\delta \rho_e} = \sum_{e' \in \omega_e} \frac{\delta G' \delta A \delta \overline{p_{e'}}}{\delta A \delta \overline{p_{e'}} \delta \rho_e} \quad \forall e \in \Omega$$

$$\frac{\delta G'}{\delta A} = \frac{1}{p}A^{\frac{1}{p}-1}$$

$$\frac{\delta A}{\delta \overline{p_{e'}}} = \frac{p \cdot \overline{p_{e'}}^{p-1}}{\alpha_{e'}^p}$$

$$\frac{\delta \overline{p_{e'}}}{\delta \rho_e} = \frac{1}{|\omega_{e'}|}$$

Using a gradient-based mathematical programming method (e.g. the MMA optimizer) in conjunction to the dynamic LVC and its gradient, the method allows, in a computationally efficient manner, to optimize the design to have a varying LVC throughout the design space.

Note that by following similar steps as described above, the constraint may in other examples be formulated as follows:

$$G'' = \left(\frac{1}{|\Omega|}\sum_{e \in \Omega}(\overline{p_e} - \alpha_e + 1)^p\right)^{\frac{1}{p}} - 1 \leq 0$$

Moreover, the above equations may also be formulated using other differentiable aggregation functions.

The new constraint having different properties for each element of the design space may be controlled by the field $\omega_e$ or the field $\alpha_e$, or both of these fields. These may be called the constraint fields. These fields define for the optimization setup the desired local volume fraction for each point in space.

Workflows integrating the method are now discussed.

In workflows, the non-uniform distribution of local quantity constraints may be set manually by a user on the FEM, using no other information than the data associated to the FEM (e.g. without any information on individual finite element characteristics other than their location).

In other workflows, the method may alternatively or alternatively comprise prior to the topology optimization under the non-uniform LVC distribution, performing another and initial topology optimization based on the FEM and the generic data associated to the FEM (i.e. at this point with no non-uniform LVC distribution). In such a case, the method may comprise manually, semi-automatically or fully automatically determining the non-uniform distribution based on a result of said other topology optimization. The initial topology optimization thus forms a preprocessing which allows setting the local quantity constraints.

As known per se from the field of topology optimization, the initial topology optimization may provide as a result a density field (i.e. a value of volume fraction of material per finite element of the FEM), and optionally as other results a strain field associated (corresponding) to said density field, a stress field associated to said density field, and/or a compression field associated to said density field. In such a case, the method may comprise determining the non-uniform distribution based on any one or any combination of such resulting fields.

In examples, the method may comprise determining one or more local quantity constraints automatically based on the density, strain, stress and/or compression fields. The initial topology optimization may provide an initial distribution/layout of material optimized for the simplified forces/loads of the problem formulation and mechanical characteristics thereof in the form of the fields. The method may rely upon this information to establish where there need to apply LVC(s).

This automatism may be implemented in different ways.

As an example, the method may use the value provided for one or more respective finite elements of the FEM, by the density field, or by any normalized function (i.e. having values between 0 and 1) of any one or any combination of the density, strain, stress and/or compression fields, directly as the upper bound in an LVC constraint provided for said respective finite elements of the FEM. The local zone may in such a case be defined in any way discussed above, for example as a neighborhood e.g. of a predetermined and constant radius.

As an alternative example, the method may comprise thresholding said density field or said normalized function. In other words, the method may cluster the values of the field(s) resulting from the initial topology optimization, thereby partitioning the FEM into different regions of finite elements. The number of cluster may be strictly higher than 1 and/or strictly lower than 20 or 10, for example equal to 2, 3, 4 or 5. A respective upper bound may then be defined for each region, based on the values of the field(s) in said region.

In examples, the method may alternatively or additionally comprise displaying a graphical representation of the density field (for example using gray scales or color intensities), and determining one or more local quantity constraints via (e.g. graphical) user-interaction, In such a case, the constraint differentiation may depend on factors such as the zone being one having a force, having a clamping, or being expected to become a narrowing zone of the modeled object.

In an industrial setting, it may be practical and desirable to modulate the constraint in regions of high strain or stress. Therefore, to locate these regions, a proposed approach may initially execute a full (general) topology optimization without any LVC or Penalization forcing a solid/void design but just applying the GVC.

A result of this very simple optimization may be a relative density field where the relative density of each element can have the freedom of choosing any relative density value in the range [0-1] between void and solid material without the penalization enforcing theses values toward 0 or 1. However, as expected at some locations relative density values of 0 or 1 may still be observed.

The method may comprise using this relative density field to create a constraint field needed for executing a second full topology optimization with penalization and using the dynamic LVC.

As discussed above, this may be performed simply by transferring the relative elemental density field of the first converged optimization as a constraint field for the second optimization. However, numerical tests for specific examples showed that better results could be achieved for these examples by doing some automatic thresholding of the relative density field to define partitions of regions, and then chose the local volume fraction parameters for each region.

Figure 6:
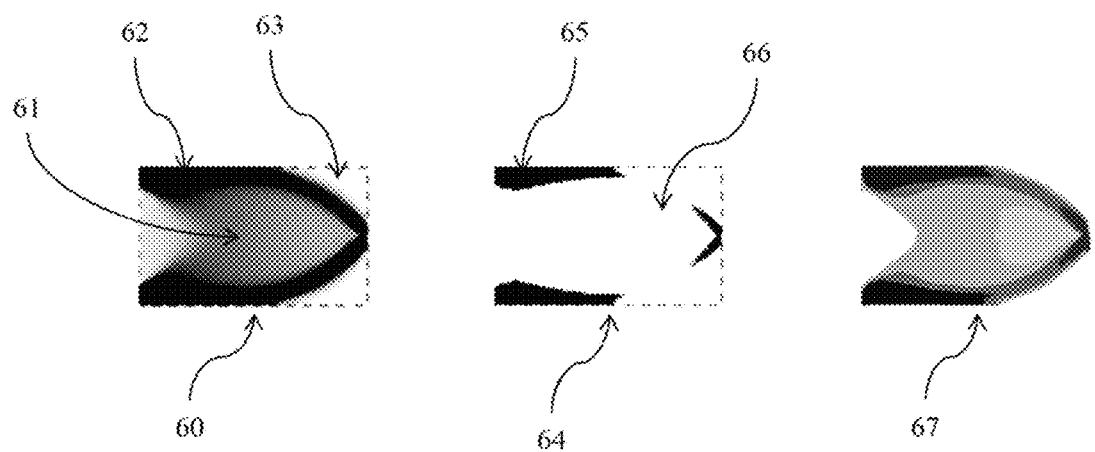

FIG. 6 shows an optimized design without penalization and thresholded fields. The figure shows the relative density field and its processed versions with thresholding and chosen local volume fraction upper bounds associated to the different regions. The initial topology optimization provides a design 60 optimized without LVC (or penalization), including elements 61 with relative density of about 0.5, elements 62 with relative density >0.9, and elements 63 with relative density <0.1. A design 64 with simple thresholding at relative density value of 0.9 leads to regions 65 with the upper bound for the local volume fraction chosen equal to 100% and regions 66 with the upper bound for the local volume fraction chosen equal to 50%. Another design 67 with multi-thresholding at relative density values of 0.9, 0.7, 0.3 and 0.1 leads to a finer partition of the FEM in different such regions.

Note that in this example the method kept the local neighborhood size constant throughout the design space. However, the method could also modulate it as shown in the mathematical formulation described previously.

Figure 7:
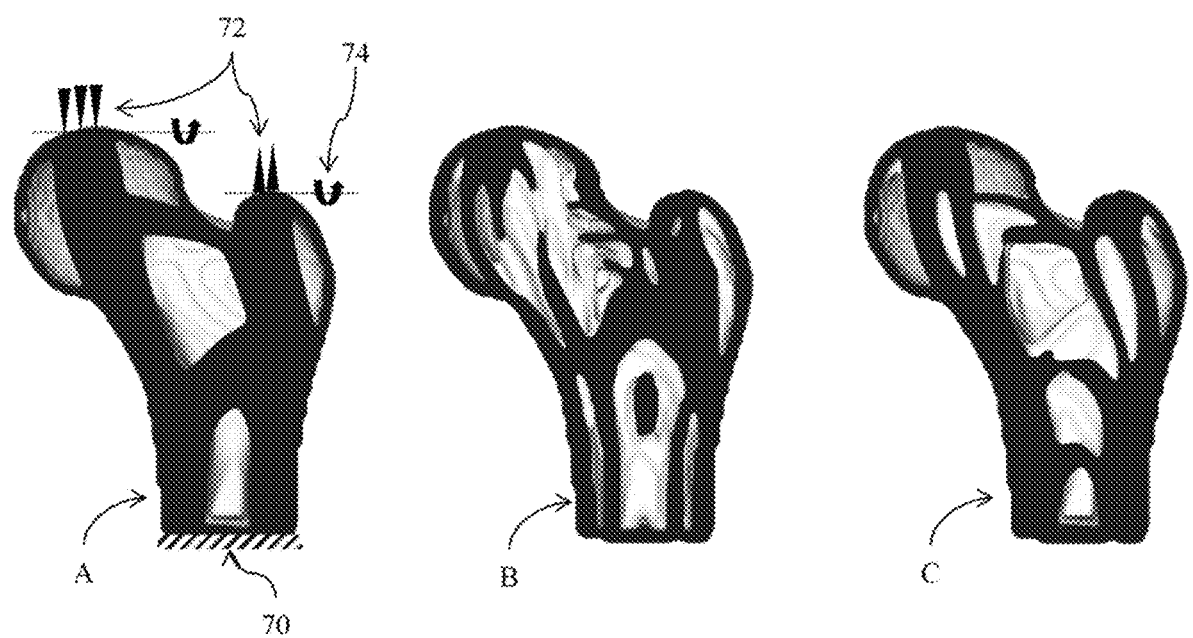

Referring to FIG. 7, in order to validate the present approach, a test on a 3D scenario was ran (a femur head model) with a clamped side 70 and forces 72. The axis of rotation 74 of forces 72 where used for the robustness test. The test generated three different optimized designs:

Design A with GVC only.
Design B with GVC and uniform LVC.
Design C with GVC and dynamic (i.e. non-uniform) LVC.

Each design has the same mass (within a 0.1% margin of error) and is displayed as a sliced view in the figure. As shown, while design A present mostly bulk regions and design B presents mostly porous regions, design C forms a hybrid of bulk and porous regions.

For each design, were tested its compliance and maximum stress under a load which progressively deviates from the initial load case specifications. This force deviation was controlled by rotating the forces around an axis 74 as shown in FIG. 7. This allows to evaluate the performances of each design and how these performances degrade as the load changes, thus showing their robustness against unexpected events.

Figure 8:
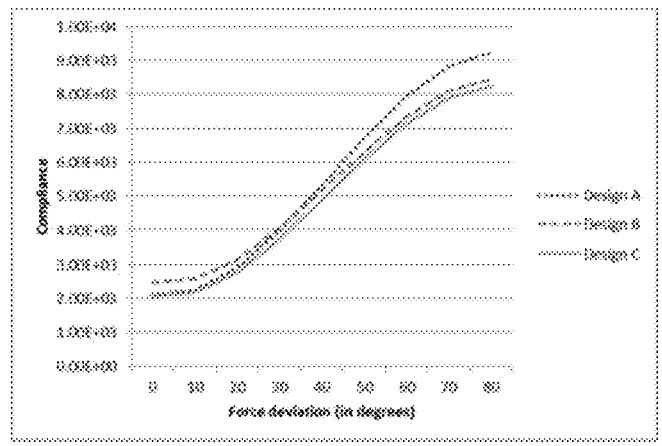
Figure 9:
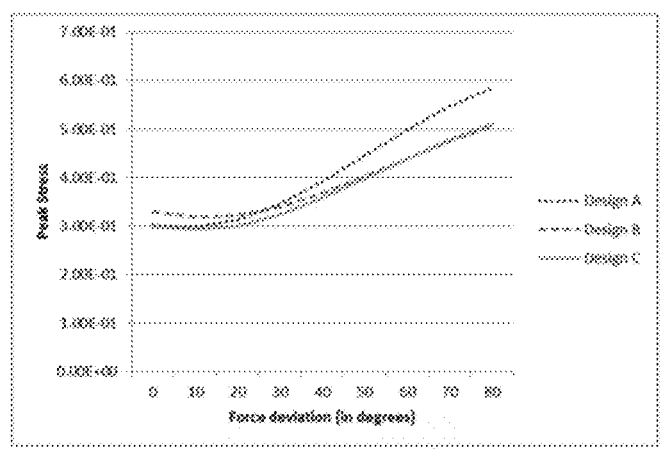

Results are shown by graphs in FIGS. 8-9 which respectively illustrate: compliance of each design considering the varying load, where high compliance means large structural deformation and thereby, low stiffness; and maximum stress of each design for a varying load, where high maximum stress means higher risk of structural failure. As shown, design A performs the best when there is no deviation from the initial specifications but its properties rapidly degrade as the force changes due to unexpected events here defined by variations in the orientation of the forces. On the other hand, design B has worse performances but, because of its better robustness, becomes better that design A as the variations in the orientation of the forces increase. Finally, design C shows properties almost identical to design A for low deviations and close to design B for high deviations in the orientation of the forces. This means that the dynamic LVC allows the optimization to yield a hybrid design which benefits both from the stiffness of the traditional design approach as well as the robustness of porous design approach. The method is able to automatically generate design C.

Examples of mechanicals parts which may be designed by the method are now discussed.

In examples, the mechanical part is an additive manufacturable part. In other words, the mechanical part is a part that may be manufactured via an additive manufacturing type of 3D printing process. As mentioned earlier, local zones respective to local quantity constraints may present an alveolar or porous structure. Each alveolus may present a size inferior to a diameter (i.e. largest size) of the local zone. The mechanical part may thus present a complex structure, meaning "lattice-like". Such complex structure may be difficult to produce via traditional manufacturing, but feasible via additive manufacturing. The method in such examples may thus be followed by an additive manufacturing process for producing one or more realizations of the mechanical part. The additive manufacturing process may take as an input the designed modeled object.

In other examples, the mechanical part may alternatively or additionally be a part having one or more functional outer regions and one or more internal regions. By "outer" region it is meant any region of the mechanical part which comprises an outer surface of the mechanical part (i.e. a surface visible from a point of view off the mechanical part). By "functional" region it is meant a region which is configured for physical interaction with another part and/or for directly receiving load cases. The designed part and the other part may be elements of a same assembly. The method may be comprised within a process for designing the assembly, including the design of each of its parts. By "internal region", it is meant a region which does not comprise any outer surface. In such examples, the internal regions may be covered with local quantity constraints while the functional outer regions may be free of any local quantity constraint. Thus, the method may allow for concentration of material in the functional outer regions and force alveolar structures in the internal regions. The concentration of material allowance may yield bulk structures of material making the functional outer regions resistant, which is useful for their function to physical interact with other parts. On the other hand, the alveolar structure of the internal regions may allow for the part to be lighter and/or to present improved thermal conduction properties. In particular examples, the outer functional regions form an outer shell of the mechanical part (fully surrounding the mechanical part).

In yet other examples, the mechanical part may alternatively or yet additionally be a vehicle part. For example, the mechanical part may be a terrestrial, an aeronautic, or an aerospatial vehicle part. In such a case, a zone subject to actioning (e.g. by physical Interaction with another part of the vehicle) may be more constrained than a zone subject only to vibrations and/or turbulences. Zones subject to actioning may be associated with forces in the data associated to the FEM. Zones subject to vibrations and/or turbulences may be covered with local quantity constraints, thereby ensuring their robustness.

FIGS. 10-20 present illustrations of such examples of mechanical parts.

Figure 10:
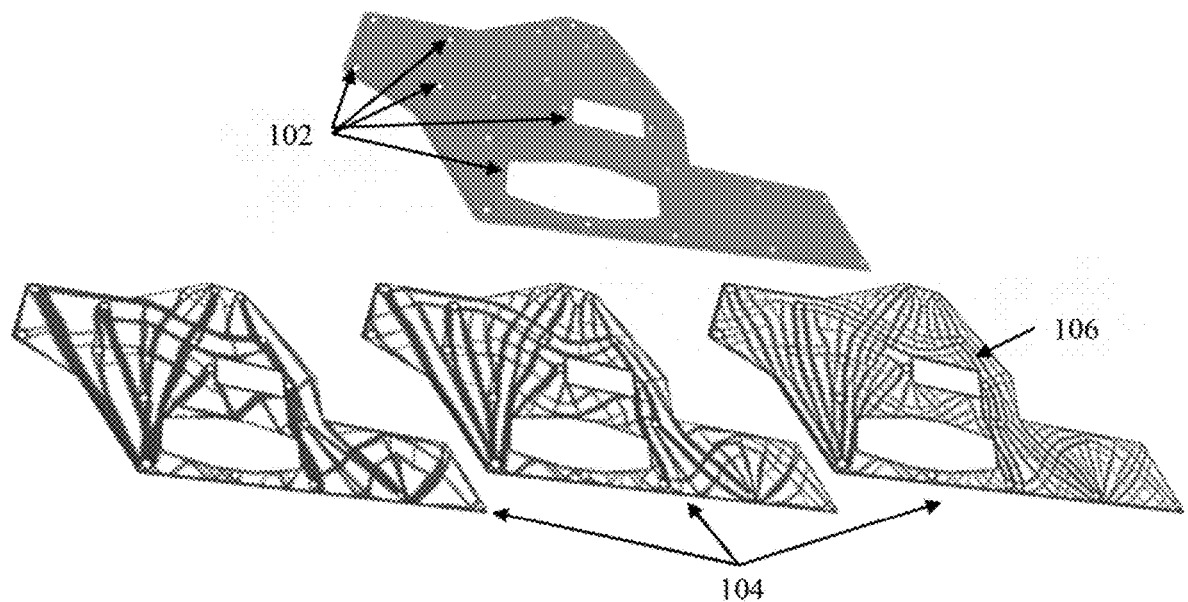
Figure 11:
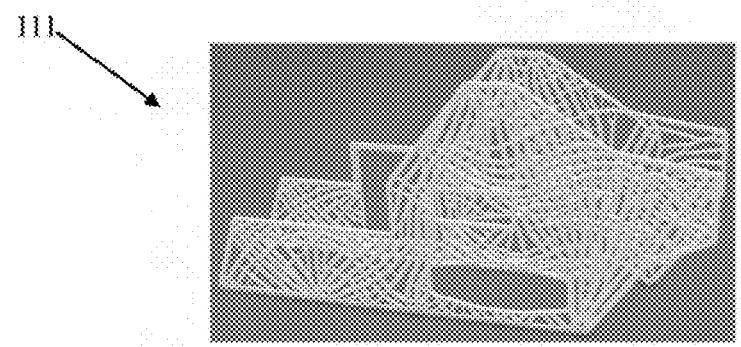
Figure 12:
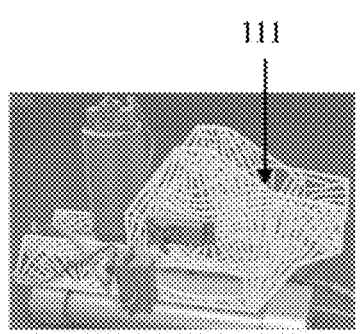
Figure 13:
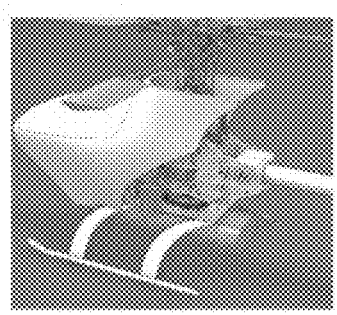

FIG. 10 shows a FEM 100 for designing helicopter structural frame part. Zones of the FEM 102 are not locally constrained. Such zones 102 correspond to actioning zones of the mechanical part, here prescribed shell areas for fixation of bolts, electrical and mechanical components. The figure shows different levels 104 of porosity controlled by the local constraining, resulting in porous structures 106 throughout the design. The porous structure fits and provides support to the prescribed shell areas where other components will be assembled and positioned. Moreover, the nature of porous structures makes them effective at dampening vibrations, thus protecting said components. The designed modeled object 111 resulting from the optimization is shown on FIG. 11. FIGS. 11-12 show how modeled object 111 may be assembled to other parts of the helicopter.

Figure 14:
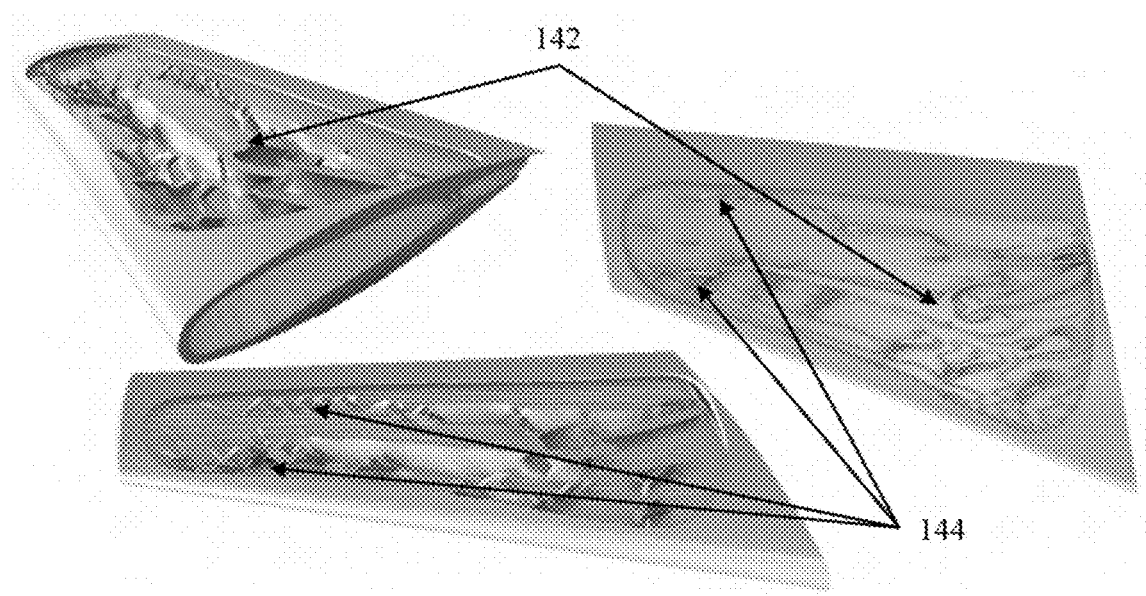

FIG. 14 show an airplane wing that may be designed with the method with cuts showing its internal structure. The wing has a central axis 142 without no local constraining allowing the creation of a solid wall structure to carry the main aerodynamic loads. The wing also has regions 144 with local constraining near the front and back of the airfoil to create sparse truss structures, in order to handle small twisting forces.

Figure 15:
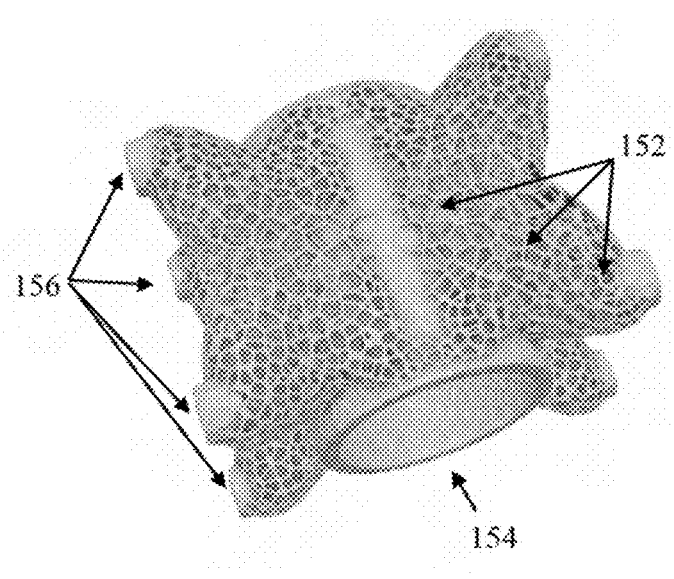

FIG. 15 shows another helicopter part, that is an electric motor holder and heat exchanger. The part has a structure 152 with varying porosity to facilitate heat exchange, designed with local constraining. The part also has solid regions 154 for electric components fixation, and solid regions 156 for bolt fixation, where no local constraining was set.

Figure 16:
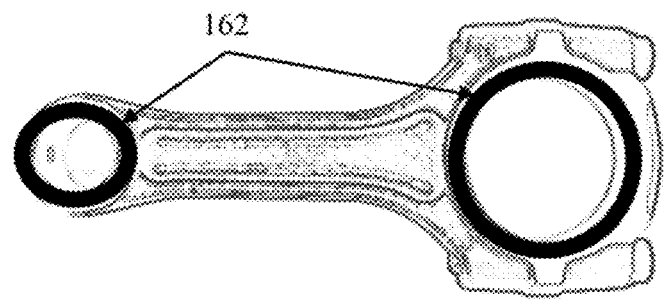
Figure 17:
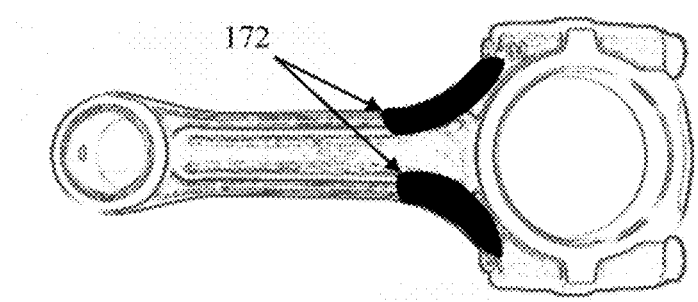
Figure 18:
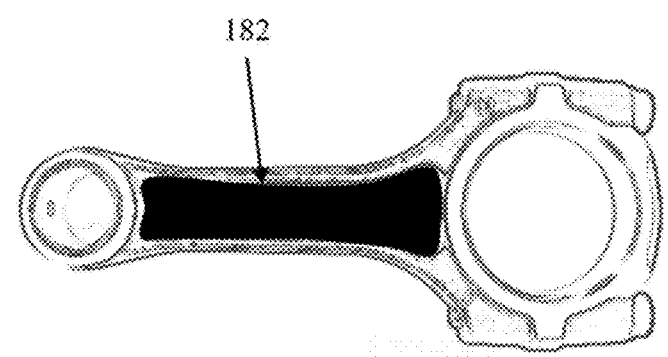

FIGS. 16-18 illustrate a connector rod, designable by the method with manual region selections for local constraining. The rod has regions 162 near loads and fixations. A manual approach could disable the local constraint here. The rod also has regions 172 with high mechanical stress as calculated by a finite element analysis. A manual approach could disable the local constraint here. The rod also has a region 182 at a safe distance from actioning zones (i.e. non-functional internal region). The user could choose to increase the local constraint only in this region.

Figure 19:
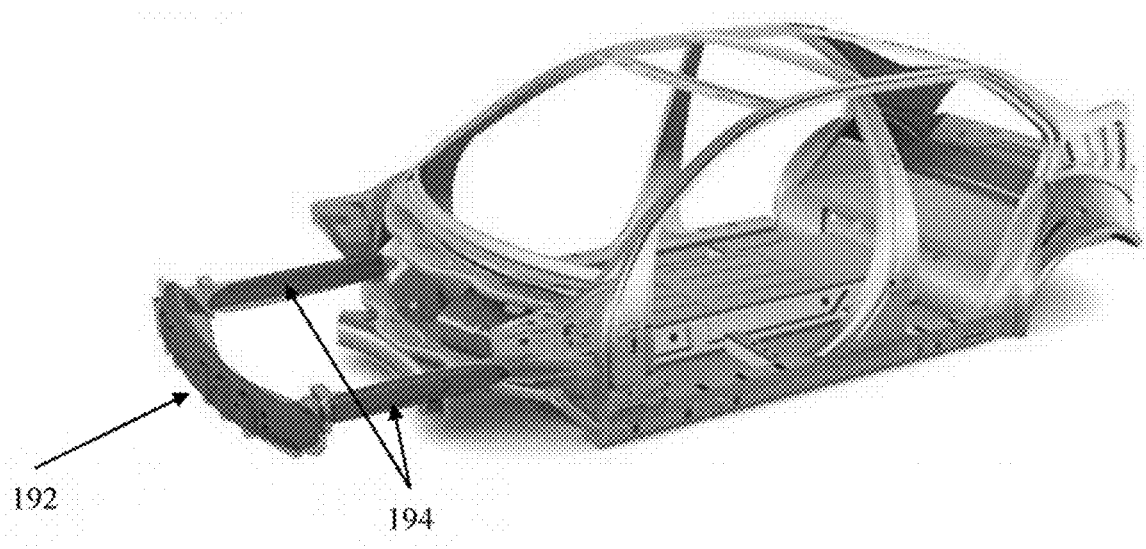

FIG. 19 shows a car front bumper for crash dampening. Due to their high redundancy, porous structures break and collapse progressively while solid structures break suddenly. Porous structures are extremely efficient at dampening the energy from a crash. The part may thus be designed with regions 192 without local volume constraint to allow the apparition of a solid front block, and regions 194 with strong local volume constraint to produce redundant porous structures.

Figure 20:
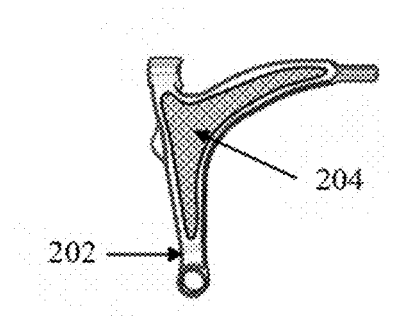

FIG. 20 shows an industrial part mixing solid and porous structures. The part is an optimized industrial part containing a solid outer shell 202 with functional regions and a porous lightweight internal region 204.

The invention claimed is:

1. A computer-implemented method for designing a modeled object representing a mechanical part to be manufactured and formed in a material having one or more local zones each presenting a porous structure, the material being subject in use to loads and having one or more constrained boundaries, the method comprising:

obtaining:
  a finite element mesh,
  data associated to the finite element mesh and including:
    forces representing part of the loads,
    boundary conditions representing at least part of the one or more constrained boundaries,
    parameters related to the material,
    a global quantity constraint relative to a global quantity of the material in the finite element mesh, and
  a non-uniform distribution of one or more local quantity constraints each relative to a respective local quantity of the material in a respective local zone of the finite element mesh; and
performing a topology optimization based on the finite element mesh, the data associated to the finite element mesh, and the non-uniform distribution, each local quantity constraint representing a respective upper bound ($\alpha_e$) for the respective local quantity ($\overline{\rho}_e$) to force, as a result of the topology optimization, robustness in a region covered by the one or more respective local zone by forbidding concentration of material in the region beyond the respective upper bounds, the topology optimization thereby forcing the spreading of the material in the region, thereby leading to the creation of a porous structure in the region.

2. The method of claim 1, wherein the mesh has a set ($\Omega$) of elements (e) each having a respective relative density ($\rho_e$) of the material which varies during iterations of the topology optimization, the non-uniform distribution comprising a plurality of local quantity constraints ($\overline{\rho}_e \leq \alpha_e$) each on a respective element (e), the respective local zone of each respective local quantity constraint being a respective neighborhood ($\omega_e$) of the respective element (e), the respective local quantity of each respective neighborhood ($\omega_e$) being a respective average $$\left(\overline{\rho}_e = \frac{1}{|\omega_e|} \sum_{e' \in \omega_e} \rho_{e'}\right)$$

of the relative density ($\rho_e$) of the material in the respective neighborhood ($\omega_e$).

3. The method of claim 2, wherein the method further comprises aggregating the plurality of local volume constraints ($\overline{\rho}_e \leq \alpha_e \ \forall e \in \Omega$) into a single aggregated constraint (G, G', G").

4. The method of claim 3, wherein the aggregated constraint (G, G', G") represents a constant bound (0, 1) for an extremum $$\left(\max_{e \in \Omega}\left(\frac{\overline{\rho}_e}{\alpha_e}\right)\right),$$

defined over the set ($\Omega$) of elements (e), of a disparity $$\left(\frac{\overline{\rho}_e}{\alpha_e}, \overline{\rho}_e - \alpha_e + 1\right)$$

between the respective average ($\overline{\rho}_e$) and the respective upper bound ($\alpha_e$).

5. The method of claim 4, wherein the extremum is a maximum, and the aggregated constraint $$\left(G' = \left(\frac{1}{|\Omega|}\sum_{e\in\Omega}\left(\frac{\overline{\rho_e}}{\alpha_e}\right)^p\right)^{\frac{1}{p}} - 1 \leq 0,\right.$$

$$\left.G'' = \left(\frac{1}{|\Omega|}\sum_{e\in\Omega}(\overline{\rho_e} - \alpha_e + 1)^p\right)^{\frac{1}{p}} - 1 \leq 0\right)$$

approximates said maximum with a differentiable function, and performing the topology optimization comprises performing a gradient-based optimization.

6. The method of claim 5, wherein the differentiable function is a P-Norm $$\left(\left(\frac{1}{|\Omega|}\sum_{e\in\Omega}\left(\frac{\overline{\rho_e}}{\alpha_e}\right)^p\right)^{\frac{1}{p}}, \left(\frac{1}{|\Omega|}\sum_{e\in\Omega}(\overline{\rho_e} - \alpha_e + 1)^p\right)^{\frac{1}{p}}\right).$$

7. The method of claim 5, wherein the gradient-based optimization is a method of moving asymptotes.

8. The method of claim 1, wherein the method further comprises prior to performing the topology optimization:
  performing another topology optimization based on the finite element mesh and the data associated to the finite element mesh, and
  determining the non-uniform distribution based on a result of the other topology optimization.

9. The method of claim 8, wherein the result of the other topology optimization comprises a density field, a strain field, a stress field and/or a compression field, and determining the non-uniform distribution includes:
  determining one or more local quantity constraints automatically based on the density field, the strain field, the stress field and/or the compression field; and/or
  displaying a graphical representation of the density field, the strain field, the stress field and/or the compression field, and determining one or more local quantity constraints via user-interaction.

10. The method of claim 1, wherein the mechanical part is an additive manufacturable part, a part having one or more functional outer regions and one or more internal regions, and/or a vehicle part.

11. A non-transitory data storage medium having recorded thereon a modeled object designable by a computer-implemented method for designing a modeled object representing a mechanical part to be manufactured and formed in a material having one or more local zones each presenting a porous structure, the material being subject in use to loads and having one or more constrained boundaries, the method comprising:
  obtaining:
    a finite element mesh,
    data associated to the finite element mesh and including:
      forces representing part of the loads,
      boundary conditions representing at least part of the one or more constrained boundaries,
      parameters related to the material,
      a global quantity constraint relative to a global quantity of the material in the finite element mesh, and
      a non-uniform distribution of one or more local quantity constraints each relative to a respective local quantity of the material in a respective local zone of the finite element mesh; and
  performing a topology optimization based on the finite element mesh, the data associated to the finite element mesh, and the non-uniform distribution, each local quantity constraint representing a respective upper bound ($\alpha_e$) for the respective local quantity ($\overline{\rho_e}$) to force, as a result of the topology optimization, robustness in a region covered by the one or more respective local zone by forbidding concentration of material in the region beyond the respective upper bounds, the topology optimization thereby forcing the spreading of the material in the region, thereby leading to the creation of a porous structure in the region.

12. The non-transitory data storage medium of claim 11, wherein the mesh has a set ($\Omega$) of elements (e) each having a respective relative density ($\rho_e$) of the material which varies during iterations of the topology optimization, the non-uniform distribution comprising a plurality of local quantity constraints ($\overline{\rho_e} \leq \alpha_e$) each on a respective element (e), the respective local zone of each respective local quantity constraint being a respective neighborhood ($\omega_e$) of the respective element (e), the respective local quantity of each respective neighborhood ($\omega_e$) being a respective average $$\left(\overline{\rho_e} = \frac{1}{|\omega_e|}\sum_{e'\in\omega_e}\rho_{e'}\right)$$

of the relative density ($\rho_e$) of the material in the respective neighborhood ($\omega_e$).

13. A non-transitory data storage medium having recorded thereon a computer program comprising instructions for performing a method for designing a modeled object representing a mechanical part to be manufactured and formed in a material having one or more local zones each presenting a porous structure, the material being subject in use to loads and having one or more constrained boundaries, the method comprising:
  obtaining:
    a finite element mesh,
    data associated to the finite element mesh and including:
      forces representing part of the loads,
      boundary conditions representing at least part of the one or more constrained boundaries,
      parameters related to the material,
      a global quantity constraint relative to a global quantity of the material in the finite element mesh, and
      a non-uniform distribution of one or more local quantity constraints each relative to a respective local quantity of the material in a respective local zone of the finite element mesh; and
  performing a topology optimization based on the finite element mesh, the data associated to the finite element mesh, and the non-uniform distribution, each local quantity constraint representing a respective upper bound ($\alpha_e$) for the respective local quantity ($\overline{\rho_e}$) to force, as a result of the topology optimization, robustness in a region covered by the one or more respective local zone by forbidding concentration of material in the region beyond the respective upper bounds, the topology optimization thereby forcing the spreading of the material in the region, thereby leading to the creation of a porous structure in the region.

14. The non-transitory data storage medium of claim 13, wherein the mesh has a set ($\Omega$) of elements (e) each having a respective relative density ($\rho_e$) of the material which varies during iterations of the topology optimization, the non-uniform distribution comprising a plurality of local quantity constraints ($\overline{\rho_e} \leq \alpha_e$) each on a respective element (e), the respective local zone of each respective local quantity constraint being a respective neighborhood ($\omega_e$) of the respective element (e), the respective local quantity of each respective neighborhood ($\omega_e$) being a respective average $$\left( \overline{\rho_e} = \frac{1}{|\omega_e|} \sum_{e' \in \omega_e} \rho_{e'} \right)$$

of the relative density ($\rho_e$) of the material in the respective neighborhood ($\omega_e$).

15. A system comprising:
a processor coupled to a memory and a graphical user interface, the memory having recorded thereon a computer program including instructions,
wherein the system is configured to design a modeled object representing a mechanical part to be manufactured and formed in a material having one or more local zones each presenting a porous structure, the material being subject in use to loads and having one or more constrained boundaries by causing the processor to be configured to
obtain:
  a finite element mesh,
  data associated to the finite element mesh and including:
    forces representing part of the loads,
    boundary conditions representing at least part of the one or more constrained boundaries,
    parameters related to the material,
    a global quantity constraint relative to a global quantity of the material in the finite element mesh, and
    a non-uniform distribution of one or more local quantity constraints each relative to a respective local quantity of the material in a respective local zone of the finite element mesh; and
perform a topology optimization based on the finite element mesh, the data associated to the finite element mesh, and the non-uniform distribution, each local quantity constraint representing a respective upper bound ($\alpha_e$) for the respective local quantity ($\overline{\rho_e}$) to force, as a result of the topology optimization, robustness in a region covered by the one or more respective local zone by forbidding concentration of material in the region beyond the respective upper bounds, the topology optimization thereby forcing the spreading of the material in the region, thereby leading to the creation of a porous structure in the region.

16. The system of claim 15, wherein the mesh has a set ($\Omega$) of elements (e) each having a respective relative density ($\rho_e$) of the material which varies during iterations of the topology optimization, the non-uniform distribution comprising a plurality of local quantity constraints ($\overline{\rho_e} \leq \alpha_e$) each on a respective element (e), the respective local zone of each respective local quantity constraint being a respective neighborhood ($\omega_e$) of the respective element (e), the respective local quantity of each respective neighborhood ($\omega_e$) being a respective average $$\left( \overline{\rho_e} = \frac{1}{|\omega_e|} \sum_{e' \in \omega_e} \rho_{e'} \right)$$

of the relative density ($\rho_e$) of the material in the respective neighborhood ($\omega_e$).

\* \* \* \* \*